United States Patent
Carette et al.

(10) Patent No.: US 10,268,211 B2
(45) Date of Patent: Apr. 23, 2019

(54) METHOD FOR CONTROLLING A VALVE ACTUATOR AND A VALVE ACTUATOR CONTROL DEVICE

(71) Applicant: IMI Hydronic Engineering International SA, Eysins (CH)

(72) Inventors: Jean-Christophe Carette, Epalinges (CH); André Lenoir, Bovesse (BE); Bernhard Henke, Brilon (DE); Christoph Rohwetter, Bad Sassendorf (DE)

(73) Assignee: IMI HYDRONIC ENGINEERING INTERNATIONAL SA, Eysins (CH)

( * ) Notice: Subject to any disclaimer, the term of this patent is extended or adjusted under 35 U.S.C. 154(b) by 55 days.

(21) Appl. No.: 15/299,971

(22) Filed: Oct. 21, 2016

(65) Prior Publication Data
US 2017/0115669 A1   Apr. 27, 2017

(30) Foreign Application Priority Data
Oct. 23, 2015 (EP) .................... 15191197

(51) Int. Cl.
- *G05D 7/06* (2006.01)
- *F16K 31/00* (2006.01)
- *F16K 31/04* (2006.01)
- *F16K 37/00* (2006.01)

(52) U.S. Cl.
CPC .......... *G05D 7/0617* (2013.01); *F16K 31/00* (2013.01); *F16K 31/04* (2013.01); *F16K 37/0025* (2013.01); *F16K 37/0075* (2013.01)

(58) Field of Classification Search
CPC ....... G05D 7/0617; F16K 31/00; F16K 31/04; F16K 37/0025; F16K 37/0075
See application file for complete search history.

(56) References Cited

U.S. PATENT DOCUMENTS

| 4,760,547 | A | * | 7/1988 | Duxbury | ............... | A01G 25/16 239/69 |
| 5,173,855 | A | * | 12/1992 | Nielsen | .................. | A01G 25/16 239/69 |
| 7,066,192 | B1 | | 6/2006 | Delaney et al. | | |
| 7,844,367 | B2 | * | 11/2010 | Nickerson | .............. | A01G 25/16 137/624.11 |

(Continued)

FOREIGN PATENT DOCUMENTS

WO   WO 2015/091690 A1   6/2015

OTHER PUBLICATIONS

European Search Report in corresponding European application No. 15191197.1, dated Apr. 19, 2016, 8 pages.

*Primary Examiner* — Eric Keasel
(74) *Attorney, Agent, or Firm* — Buchanan Ingersoll & Rooney P.C.

(57) ABSTRACT

A method for controlling a valve actuator, a valve actuator control device and a valve actuator assembly. The method includes the steps of providing a valve actuator control device, connecting the control device to a valve actuator with a signal transmitting wire, and supplying operating power to the valve actuator from the control device. The method further includes a step of transmitting control signals from the control device to the valve actuator via the signal transmitting wire in order to control the actuator. Hereby, configuration, control and maintenance of valve actuators are facilitated.

4 Claims, 5 Drawing Sheets

(56) References Cited

U.S. PATENT DOCUMENTS

| | | | |
|---|---|---|---|
| 8,606,373 B2 * | 12/2013 | Lozier | A62C 37/00 169/54 |
| 2004/0004200 A1 | 1/2004 | Pescatore | |
| 2010/0000612 A1 | 1/2010 | Gebler et al. | |

* cited by examiner

METHOD FOR CONTROLLING A VALVE ACTUATOR AND A VALVE ACTUATOR CONTROL DEVICE

TECHNICAL FIELD OF THE INVENTION

The present invention relates to a method for controlling a valve actuator, a valve actuator control device and a valve actuator assembly, more specifically it relates to an external and portable valve actuator control device.

BACKGROUND

Fluid distribution systems, for e.g. heating, cooling and water supply are designed to feed a fluid from a source to a consumption point. Each consumption point typically has a calculated and designed flow or differential pressure requirement. However depending on the type of hydronic system, the flow requirement is often variable over time and can change with factors like seasonality (e.g. summer or winter), that changes the load from the consumption points, temperature changes of the system fluid, changes in consumption of the system fluid (e.g. for drinking water).

Control valves (e.g. sliding stem valves, rotary valves, etc.) are frequently used in fluid distribution system and have a variable opening such that the flow rates can be controlled. It is commonly known to provide an actuator (e.g. electric or pneumatic) in association with a control valve in order to provide for automatic operation of the control valve. In their most basic form, actuators are provided with manual means of operation, often in the form of a handwheel which allows local operators to manually adjust the flow rate. However, most conventional actuators are provided with a set of jumpers or dipswitches in order to control and to configure operating parameters of the actuator.

These actuators are rather limited in their operational control, and it is often a very cumbersome task for a local operator to manage sites where there are large amounts of actuators. Some valve actuators are able to connect to a larger grid having a control desk or a common node from which the plurality of valve actuators may be controlled. However, oftentimes there still needs to be a local operator in case of various failures or during setup of HVAC (heating, ventilation and air conditioning) systems.

As mentioned conventional systems only provide a limited number of options for the different parameters that need to be adjusted. This limits the flexibility of operation of the actuators and consequently limits the performance in various applications that the actuators are used with.

Moreover, another drawback of currently known systems is during the installation or setup of an HVAC system, i.e. before there is a possibility to connect the actuators to the power or control grid.

To this end the local operators are forced to mechanically/manually (by e.g. using a hand wheel) operate the valve actuators in these situations e.g. to adjust the stroke of the actuator. This quickly becomes an overwhelming task for even the most skilled operators, especially when dealing with large numbers of control valves and even more so if the local operator needs to configure all of the actuators according to some predefined operating parameters.

There is therefore a need for an improved method and system for operating valve actuators, in particular when the valve actuators are disconnected from a power grid or control grid.

SUMMARY

It is accordingly an object of the present invention to provide a valve actuator assembly for a fluid distribution system, a valve actuator control device for controlling a valve actuator and a method for controlling a valve actuator when it is disconnected from the grid which alleviates all or at least some of the above-discussed drawbacks of the presently known systems and methods.

This object is achieved by means of a method for controlling a valve actuator, a valve actuator control device and a valve actuator assembly as defined in the appended claims.

According to a first aspect of the present invention there is provided a method for controlling a valve actuator when it is disconnected from a grid, said method comprising the steps of:

providing a valve actuator control device being portable and connectable with a signal transmitting wire to the valve actuator;

connecting the valve actuator control device to the valve actuator with the signal transmitting wire;

supplying operating power to the valve actuator from an energy storage unit connected to the valve actuator control device; and transmitting control signals from the valve actuator control device to the valve actuator via said signal transmitting wire in order to control the valve actuator.

The valve actuator itself is preferably arranged to operate a control valve in a valve actuator assembly, e.g. operating in terms of adjusting a variable opening by moving a valve closing member by means of an electric motor. Thus, the control signals that are transmitted from the valve actuator control device via the signal transmitting wire may for example be signals in order to control an electrical motor within the valve actuator to adjust the stroke (position of the valve closing member). The control signals may also be signals for altering or uploading a set of operating parameters which may be stored in a control unit or memory unit comprised by the valve actuator. The valve actuator may then operate according to these operating parameters in an automated manner.

In accordance with the first aspect of the invention the valve actuator control device (may simply be referred to as control device in the following) can be arranged with an energy storage unit capable of supplying operating power both to the control device itself and also to the valve actuator. Supplying operating power in this context may be interpreted as supplying enough energy to power an internal processing unit of the valve actuator, in order to perform diagnostic tests or configure operating parameters. However, supplying operating power may also be interpreted as supplying enough energy to power the electric motor within the valve actuator; in order to adjust the stroke, perform self-tests, calibration, etc.; or it may be interpreted as a combination of both. The operating power to the valve actuator may be supplied via the signal transmitting wire. Thus, when the valve actuator is disconnected from the grid and the local operator can simply connect the valve actuator control device to the valve actuator and adjust the stroke e.g. with the push of a button (or a touch-sensitive area, a joystick, etc.), instead of being forced to adjust the stroke manually by turning a hand wheel. Also since the operating power (in the form of electricity) is supplied via the signal transmitting wire there is no need for a plurality of wired connections between the valve actuator and the valve actuator control device.

Furthermore, the configuration of valve actuators can be facilitated since this now can be done by connecting the valve actuator control device to the valve actuator and then e.g. pressing a "configuration button", in order to transmit and upload a set of predefined operating parameters to the valve actuator. In contrast to conventional valve actuators where a manual configuration is performed, e.g. by flipping a number of jumpers or dipswitches. The set of predefined operating parameters may be stored in an internal memory storage unit of the valve actuator control device; the operating parameters are then accessed and uploaded to a control unit within the valve actuator.

The present invention is based on the realization that by providing an external and portable device that is connectable, with a wire, to a valve actuator, one can realize a fluid distribution system that facilitates a local operator's job drastically and further provides for a system which is far superior to conventional systems in terms of local operational control and versatility. External and portable in this context should be interpreted as a device that is external to the valve actuator and that is easily carried or moved. The present invention is particularly useful during installations of actuators, in other words, before the valve actuator is to be connected to the grid (i.e. when it is not supplied with electrical power). This is because the local operator can control the actuator, perform diagnostic tests on site and set a vast number of operating parameters regardless if the valve actuator is "online" or "offline". In particular it can be important to ensure proper installation or setup of the valve actuator before it is connected to grid in order to reduce the risk of unstable control behaviour, generation of pulses of flow in the hydronic system which degrades the operation and could potentially damage components within the system. This is made possible due to the fact that the valve actuator control device can be provided with an energy storage unit capable of powering the valve actuator and the control device itself. The energy storage unit may be an internal energy storage unit e.g. a rechargeable battery integrated inside the control device. The energy storage unit can also be a separate unit and easily attachable to the control device similarly to batteries used together with power tools, such as e.g. hand drills. Moreover, the number of possible operating parameters that can be configured/set is increased in comparison to conventional actuators/systems utilizing e.g. the usual 10-12 jumpers or dipswitches to set the operating parameters. It goes without saying that the valve actuator control device with its energy storage unit is intended for applications with valve actuators of suitable size in relation to the specifications of the internal energy storage unit.

Further, at sites having a large number of valve actuators there is a general problem when all of the actuators need to be configured according to a predefined set of parameters or tested before live operation. As a remedy to this the present invention allows for a fast and simple way to perform this otherwise herculean task since the operator now simply can connect the control device to the valve actuator and more or less push a button (or a touch-sensitive area, a joystick, etc.) in order to upload a set of parameters or perform a diagnostic test.

In one exemplary embodiment the method further comprises the step of receiving information signals from the valve actuator to the valve actuator control device via said signal transmitting wire in order to retrieve a set of internal parameters of the valve actuator. The information signals can be data regarding the operation of the valve actuator, e.g. current operating parameters, operational time, error-logs, operating parameter logs, etc. An internal control unit of the valve actuator can perform data logging of a history of the activity of the valve actuator, which then may be accessed by the control device. This may drastically facilitate diagnostic tests of the valve actuator.

In another exemplary embodiment the method further comprises the step of detecting a model type of said valve actuator from the received information signals from the valve actuator. This further facilitates the configuration or installation of the valve actuators since a specific set of operating parameters for each specific model type of valve actuator can be stored within the valve actuator control device and accessed depending on the detected model type. Thus, one can have a single valve actuator control device that is compatible with a number of valve actuator models, i.e. a more "universal" actuator control device. Meaning that the local operator is relieved of the duty of remembering a number of different sets of operating parameters for each different model type which may be present at large sites having numerous different valve actuators. The different sets of operating parameters (all of which are associated with a particular actuator model) are instead automatically retrieved, from e.g. an internal memory storage unit, and ready to be uploaded to the valve actuator based on the detected model. Preferably, this detecting step is performed automatically when connecting the valve actuator control device to the valve actuator in e.g. a virtual handshake procedure as known in the art.

In another exemplary embodiment the signal transmitting wire is a USB (Universal Serial Bus) cable. The utilization of USB cables allows the control device to send and receive signals or digital information to/from the valve actuator and simultaneously enable energy transfer from the control device to the valve actuator. The signal transmitting can be a regular USB/USB cable, USB/micro-USB, USB/mini-USB or any other equivalent computer bus and power connector (such as e.g. the Apple Lightning Connector).

In another exemplary embodiment the method further comprises the step of establishing a connection between a portable handheld device and the valve actuator control device. The valve actuator control device may comprise a communication unit configured to establish an operational connection with a handheld device such as e.g. a laptop, a smart phone, a tablet, a PDA, etc. The operational connection may be a wireless connection e.g. Bluetooth, ZigBee, or any other wireless RF technology. The connection may also be a wired connection e.g. USB, micro USB or mini USB, etc.

By connecting the control device to e.g. a smart phone, the operator can easily extract data from the valve actuator via the control device and use it on the smart phone, e.g. for further analysis, statistics, uploading to a remote server, sending it to other devices, etc. By means of this embodiment the steps of configuration and testing of valve actuators are further improved as operating parameters of the valve actuators can easily be extracted and compared to other data directly on the portable handheld device, in particular if the portable handheld device is equipped with, for the purpose, dedicated software (e.g. various diagnostic tools). Thus, allowing a local operator to easily perform diagnostic tests and upload the results for further analysis if needed.

Further the operating parameters which are stored in the valve actuator control device can be accessed and updated/changed by the handheld device so that the valve actuator can always be configured with the latest set of parameters (which are to be uploaded to the valve actuators). For example, the valve actuator control device may be connected to a computer which can then be used to configure/update the control device.

Even further in another exemplary embodiment, the valve actuator control device may have communication unit that is further configured to receive operating signals from said portable handheld device and to forward these operating signals to said valve actuator via said signal transmitting wire, thereby enabling the portable handheld device to control the valve actuator. For example, the stroke may be adjusted based on direct input on a handheld device, such as e.g. a smart phone or tablet, when the handheld device is connected to the valve actuator control device. This may for example be useful in situations where the additional processing power and real-time data capability provided by the handheld device is needed e.g. in order to calculate the maximum stroke depending on the currently connected valve actuator and currently required maximum flow. The calculation can then be performed by the appropriate software on the handheld device which then automatically configures the valve actuator accordingly.

Analogously in another exemplary embodiment the communication unit may be further configured to transmit internal parameters of the valve actuator, retrieved via the signal transmitting wire from the valve actuator, to the portable handheld device According to a second aspect of the inventive concept, there is provided a valve actuator control device. The valve actuator control device is an external portable device which is connectable with a signal transmitting wire to the valve actuator, where the valve actuator control device comprises:

an energy storage unit configured to power the valve actuator control device; and a transmitting unit for transmitting control signals to the valve actuator via said signal transmitting wire in order to control the valve actuator.

The energy storage unit may also be used to supply power to the valve actuator via the signal transmitting wire in addition to supplying power to the valve actuator control device itself. The energy storage unit may then be a rechargeable battery of sufficient size to power both the control device and the valve actuator simultaneously, such as e.g. a lithium-ion, lithium cobalt oxide, thin film lithium, lithium polymer, etc. Thereby providing a relatively light and portable control device external to the valve actuator which is to be used to facilitate the configuration and/or control of the valve actuator, and where the control device further has the capability of powering the valve actuator when needed.

In one exemplary embodiment the valve actuator control device further comprises a receiving unit for receiving information signals from the valve actuator via said signal transmitting wire in order to read a set of internal parameters of the valve actuator. The transmitting unit and the receiving unit may be a single unit as known in the art, also called a transceiver.

With this aspect of the invention, similar advantages, exemplary embodiments and preferred features are present as in the previously discussed first aspect of the invention, and vice versa.

According to a third aspect of the invention there is provided, a valve actuator assembly for a fluid distribution system, said assembly comprising:

a valve including:
a valve body;
a chamber arranged inside said valve body,
a fluid inlet and a fluid outlet;
a valve closing arrangement for regulating the flow of fluid from said fluid inlet to said fluid outlet via said chamber;
said closing arrangement having a closed position in which no fluid is allowed to flow through said chamber and a fully open position in which fluid is allowed to flow through said chamber, said assembly further comprising:
a valve actuator for operating said valve closing arrangement,
a valve actuator control device according to any one of the previously discussed embodiments;
wherein said valve actuator comprises means for establishing a connection with said valve actuator control device via a signal transmitting wire.

In one exemplary embodiment the valve actuator in the assembly, has a control unit which comprises a memory unit configured to receive and store an opening limitation value which is representative of a selected intermediate position between said closed position and said fully open position, wherein the control unit controls the actuator to limit the movement of the closing arrangement to positions from the closed position to the selected intermediate position, and where the valve actuator control device comprises means to replace the opening limitation value in said memory unit to a new opening limitation value. The new opening limitation value can be any value between and including the values representing the fully open and fully closed positions. The control unit may be any commercially available control unit already used in valve applications. The control unit may be updated with an appropriate printed circuit board and/or with appropriate software or the existing software may be reprogrammed for enabling an electronic memory, and where the electronic memory may be accessed and re-written by the valve actuator control device. The control unit may in general be updated with the appropriate hardware and/or software in order to be compatible with the functions of the valve actuator control device.

With this aspect of the invention, similar advantages, exemplary embodiments and preferred features are present as in the previously discussed first and second aspect of the invention.

These and other features of the present invention will in the following be further clarified with reference to the embodiments described hereinafter.

BRIEF DESCRIPTION OF THE DRAWINGS

For exemplifying purposes, the invention will be described in closer detail in the following with reference to exemplary embodiments thereof illustrated in the attached drawings, wherein.

All the figures are schematic, not necessarily to scale, and they only show parts which are necessary in order to elucidate the invention, other parts being omitted or merely suggested.

DETAILED DESCRIPTION

In the following detailed description, some embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

Figure 1:
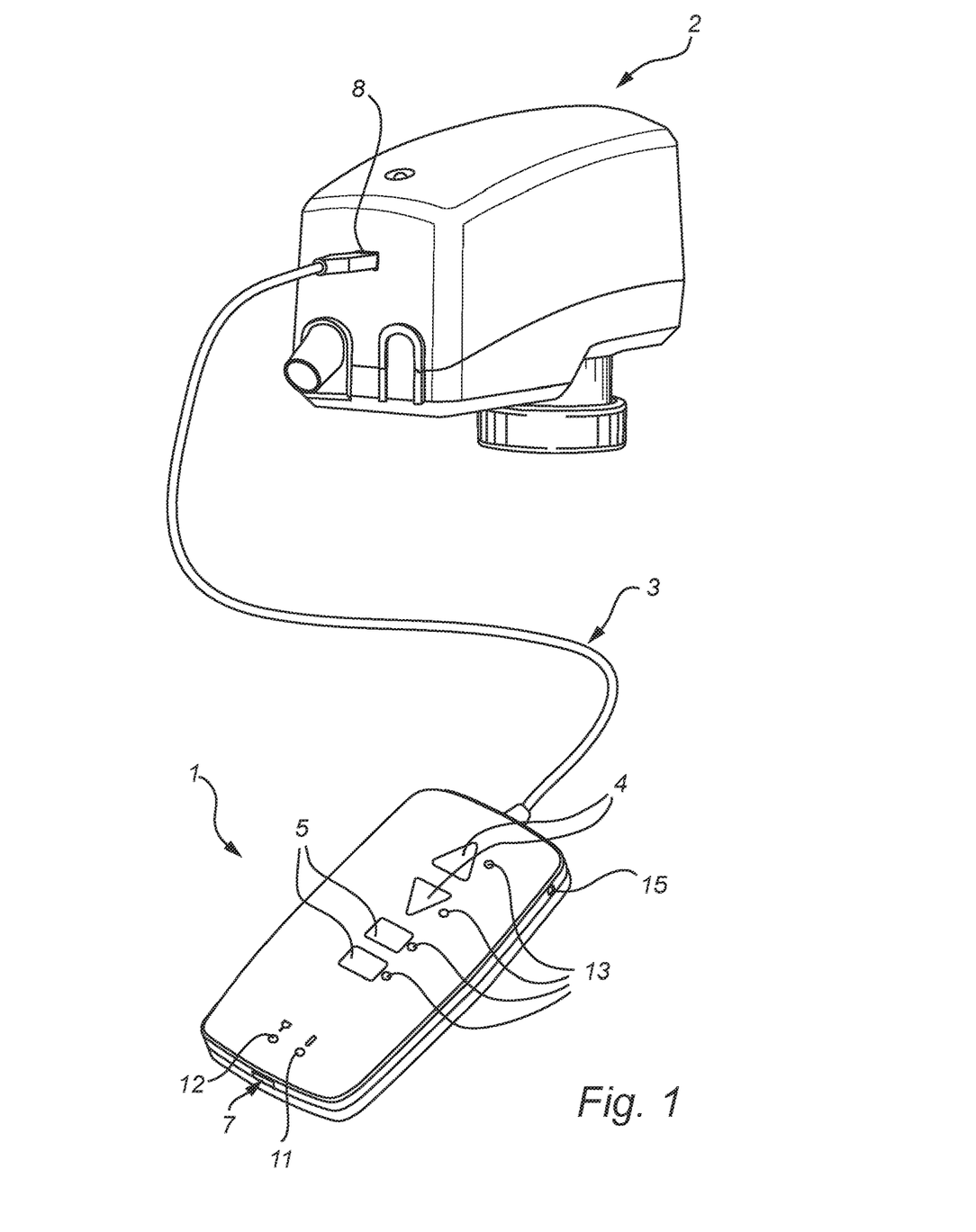
FIG. 1 shows a perspective view of a valve actuator control device connected to a valve actuator with a signal transmitting wire in accordance with at least one embodiment of the present invention.

FIG. 1 illustrates a general overview of the inventive concept with a valve actuator control device 1 (hereinafter referred to as control device 1) connected to a valve actuator 2 with a signal transmitting wire 3. The following description is in reference to FIGS. 1-2. The valve actuator may be provided with the appropriate socket/port 8 that matches at least one end 14 of the signal transmitting wire 3. The signal transmitting wire 3 may for example be a USB cable; hence the port 8 on the valve actuator may be a USB port. The valve actuator 2 is preferably arranged at a valve neck (not shown) which in turn is connected to a valve body of a control valve (not shown). The valve actuator 2 is generally utilized to control the flow rate of a fluid through the control valve as discussed in the background section. These types of configurations are readily known by the skilled artisan, and examples of such a setup or system can be found e.g. in WO 2015/091690.

Figure 2:
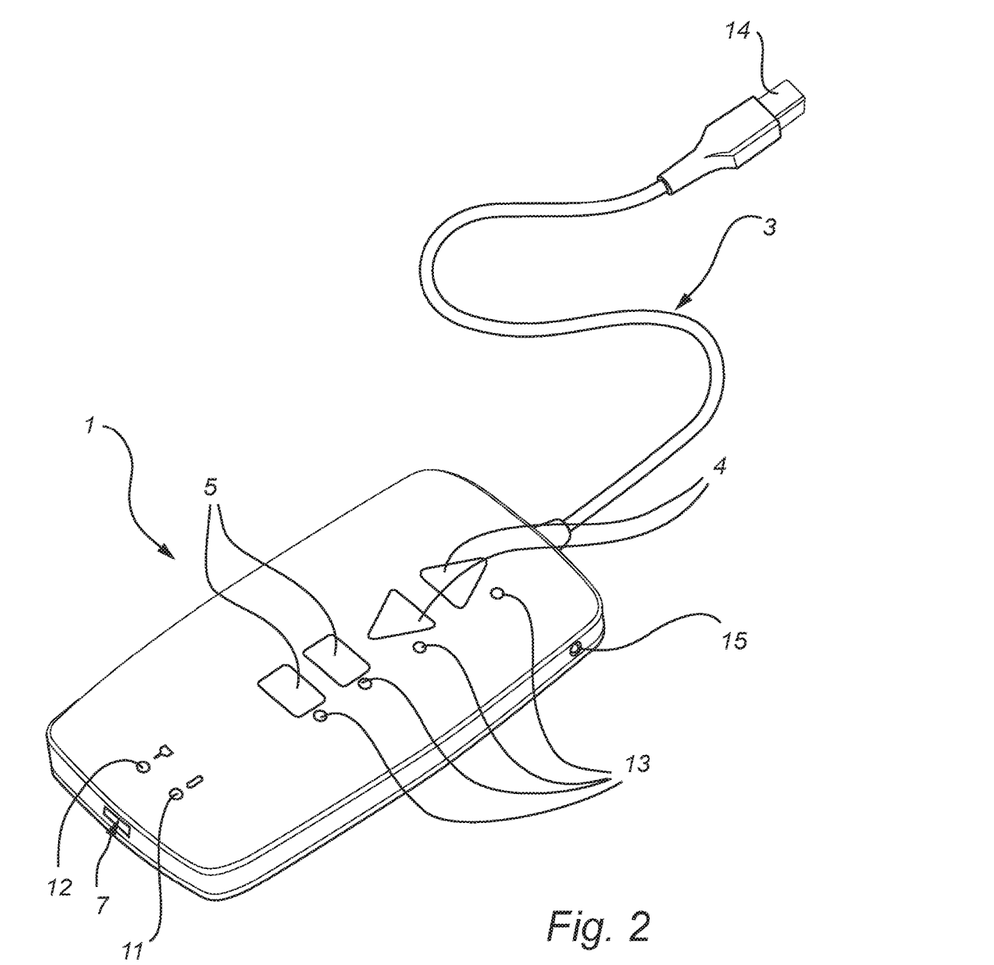
FIG. 2 shows a perspective view of a valve actuator control device with a signal transmitting wire in accordance with at least one embodiment of the present invention.

The signal transmitting wire 3 can be fixed to the control device 1 so that they form a single unit, or the signal transmitting wire 3 may be detachable both from the control device 1 and the valve actuator 2. The control device 1 is provided with a set of buttons 4, 5. The buttons 4, 5 serve merely to illustrate the functional concept and should not be considered as limiting to the scope of the invention, the buttons may instead be touch-sensitive areas or levers/joysticks, or any other equivalent solution providing a user-interface where physical stimuli is translated to electrical signals. In this particular exemplary embodiment the control device 1 has a set of control buttons 4, which may be used to adjust the stroke of the valve actuator 2, i.e. one button increases the variable opening in the control valve while the other one decreases the variable opening. In other words the control buttons 4 may be seen as "manual mode" buttons, i.e. when pushed the valve actuator 2 is manually controlled to some extent.

Further, the control device 1 may be provided with a set of configuration buttons 5. Pushing a configuration button may for example be that a set of predefined operating parameters, which are stored within the control device 1, are pushed on (uploaded to) the valve actuator 2 or a control unit within the valve actuator 2. A configuration button 5 may also be a reset button, i.e. when pushed a "reset" of the valve actuator 2 is performed, e.g. a factory reset or it may be a "connect button" in order to connect the device wirelessly to an external handheld device. A configuration button 5 may also be an automatic button, i.e. when pushed the valve actuator 2 goes in a fully automatic mode and operates according to the internally stored operating parameters. There may also be a set of programmable buttons in order to be able to store a set of predefined stroke positions, e.g. position 1, position 2 and position 3 which may be used to quickly set the stroke of a valve actuator at a certain position.

A system according to the inventive concept allows for many more parameters to be configured than what is possible with conventional systems where the valve actuators are generally equipped with 10-12 jumpers or dipswitches. The control device 1 can for example be used to configure an input signal of the valve actuator as variants within a voltage range of 0-10 VDC or a current range within 0-20 mA. The input signal may accordingly be configured to be a split-range input signal e.g. 0-5/5-10 VDC, 0-4,5/5,5-10 VDC, 2-6/6-10 VDC, 0-10/10-20 mA, etc. depending on the desired application and hardware specifications (type of signal transmitting wire 3, actuator 2 hardware and/or control device 1 hardware). Many of the currently available actuators can take only one split-range at most. Other parameters that can easily be configured by utilizing the control device 1 are for example choice of characteristics, choice of output signal, choice of speed, stroke limitation, etc.

The control device 1 may further comprise indicator lights 11, 12, 13, 15 for various functions, e.g. an "energy storage light" 11 which indicates if there is enough energy left in the energy storage unit (not shown) for successful operation and/or a "power light" light 15 for showing that the control device is currently on and operable. There may also be a "wireless light" 12 indicating if there is a handheld device connected to the control device 1. There may be indicator lights 13 provided in association with every button 4, 5 on the control device 1 in order to notify the user if for example a certain button is not operable at a certain time (e.g. by changing colour of the indicator light).

Further, the control device 1 may comprise a port 7 enabling charging of the energy storage unit (not shown), in particular if it is an internal energy storage unit. The port 7 can for example be a mini USB or micro USB port which enables charging of the energy storage unit via a USB cable that is connected to an energy source in a similar fashion as in today's smart phones or tablets. The charging port 7 may also be used to provide a wired connection to some external handheld device as well, e.g. to a computer, smart phone, PDA, tablet, etc.

Figure 3A:
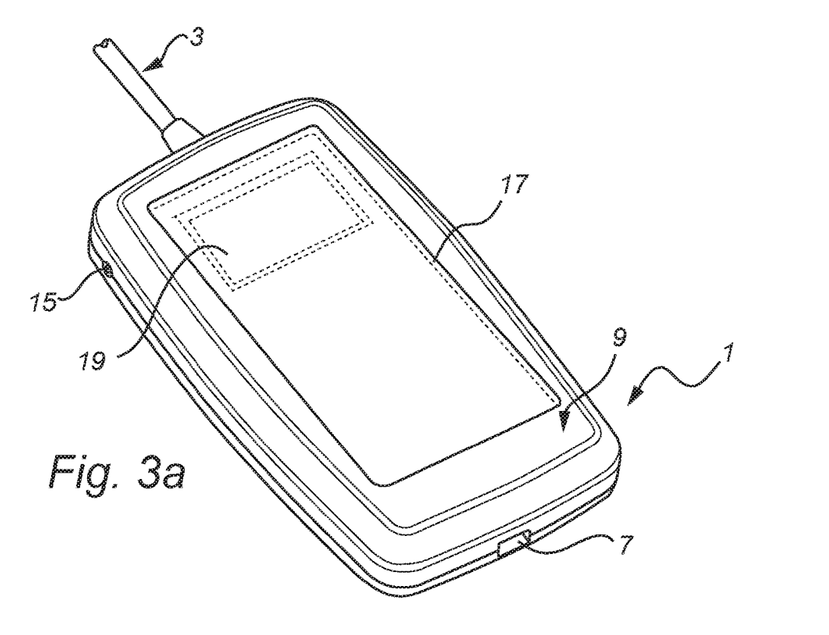
FIG. 3a-b show perspective views of the back side of a valve actuator control device in accordance with two other embodiments of the present invention.
Figure 3B:
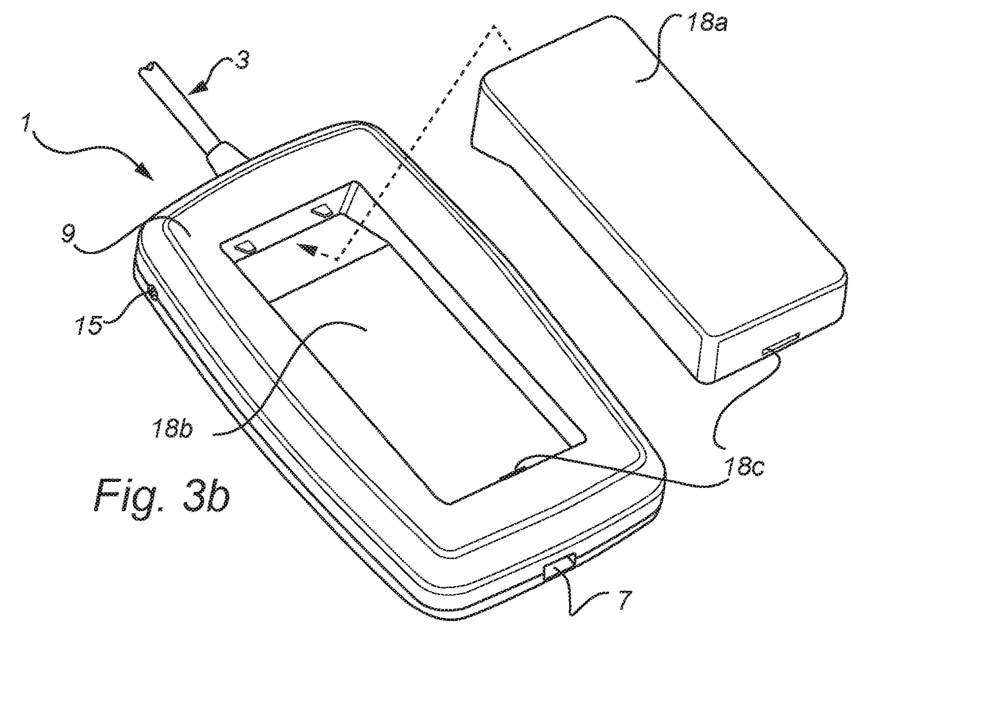

FIG. 3a-b illustrate the back-side 9 of a control device 1, the back-side 9 is to be interpreted as the opposite side of the side having the primary user interface in the form of a set of buttons 4, 5 and indicator lights 11, 12, 13, 15. However, the skilled reader realizes that both sides may comprise buttons or indicator lights without going beyond the scope of the inventive concept. In the exemplary embodiment illustrated in FIG. 3a the back-side 9 may be removable from the main body of the control device 1 or have a lid 17 in order to allow for replacement or maintenance of internal parts, such as e.g. an (internal) energy storage unit 19. However, as shown in FIG. 3b, the backside 9 may also be provided with a recess 18b capable of receiving an (external) energy storage unit, here in the form of a battery 18a, which is placed within the recess 18b and locked in place with an appropriate locking mechanism 18c, e.g. rails, push-click elements, etc. Utilizing external batteries 18a is beneficial for situations where the control device 1 is intensely used and requires a quick battery change, so that you do not have to plug in the control device 1 and wait for the battery to be recharged. Instead one can quickly remove the battery 18a (and e.g. put it in a charging station) and attach a fully charged second external battery, thereby allowing for very time efficient operation.

Figure 4:
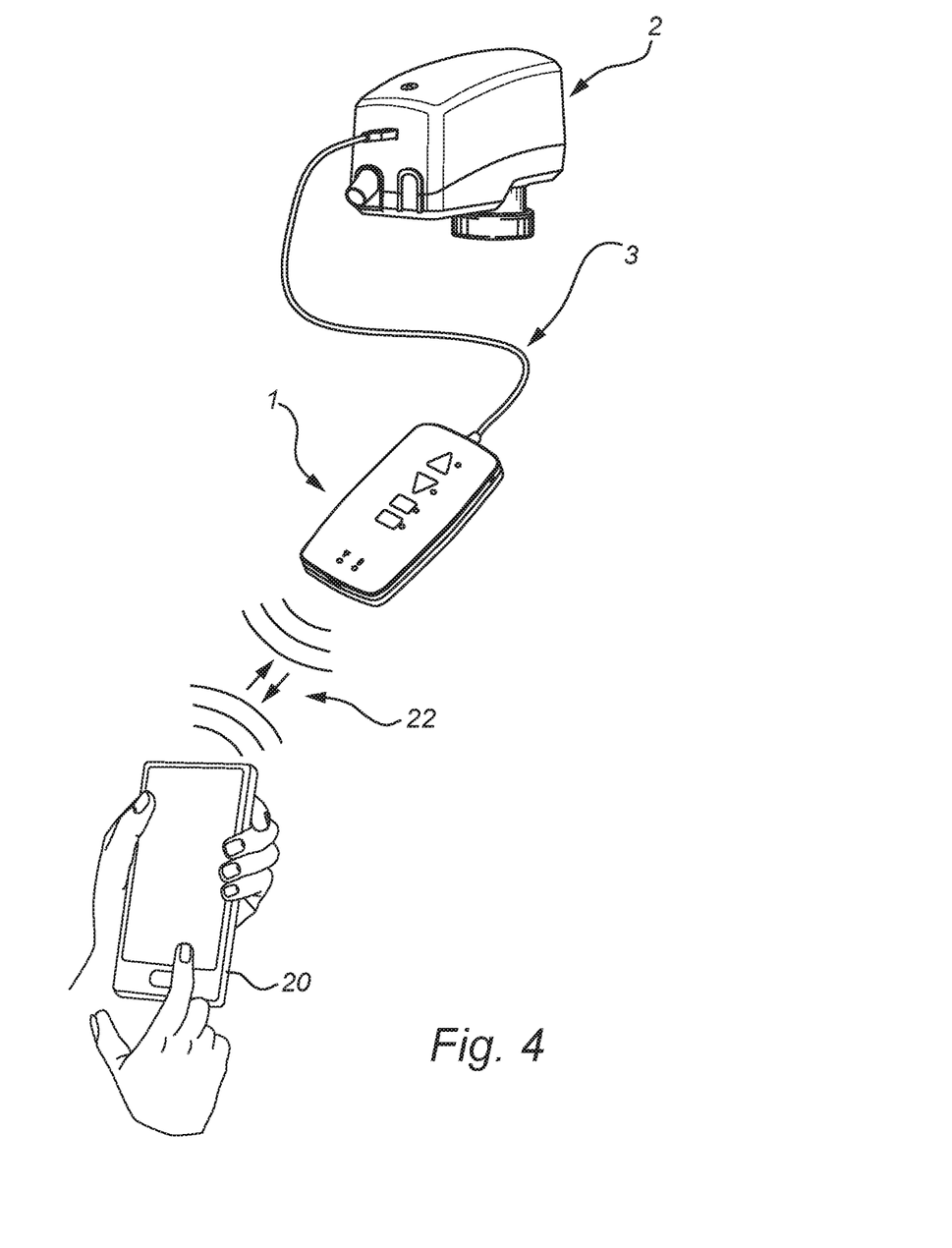
FIG. 4 shows a perspective view of a valve actuator connected to a valve actuator control device which in turn is wirelessly connected to a handheld device in accordance with another embodiment of the present invention.

FIG. 4 illustrates a handheld device 20 being wirelessly connected 22 to a control device 1 which in turn is connected to a valve actuator 2 via a signal transmitting wire 3. The wireless connection 22 can either be initiated and setup by the handheld device 20, through e.g. a Bluetooth connection or similar connection, or it may require an approval by the control device as well through e.g. pressing a button on the control device 1. Once a connection 22 has been established between the handheld device 20 and the control device 1, one can use the handheld device 20 to operate or configure the valve actuator 2, through the use of appropriate software and/or hardware provided on the handheld device 20. The handheld device 20 may also be used to configure the control device 1 once a connection 22 has been established. The established connection may be indicated by an indicator light, e.g. a "wireless light" (12 in FIG. 1 or FIG. 2). Moreover, in on exemplary embodiment the handheld device 20 could be provided with appropriate software and/or hardware in order to directly control and/or communicate with the valve actuator 2 via a signal transmitting wire 3. The handheld device 20 could then effectively be used as a valve actuator control device 1, e.g. to directly configure the valve actuator 2 or extract data-logs from the valve actuator 2 directly.

Figure 5:
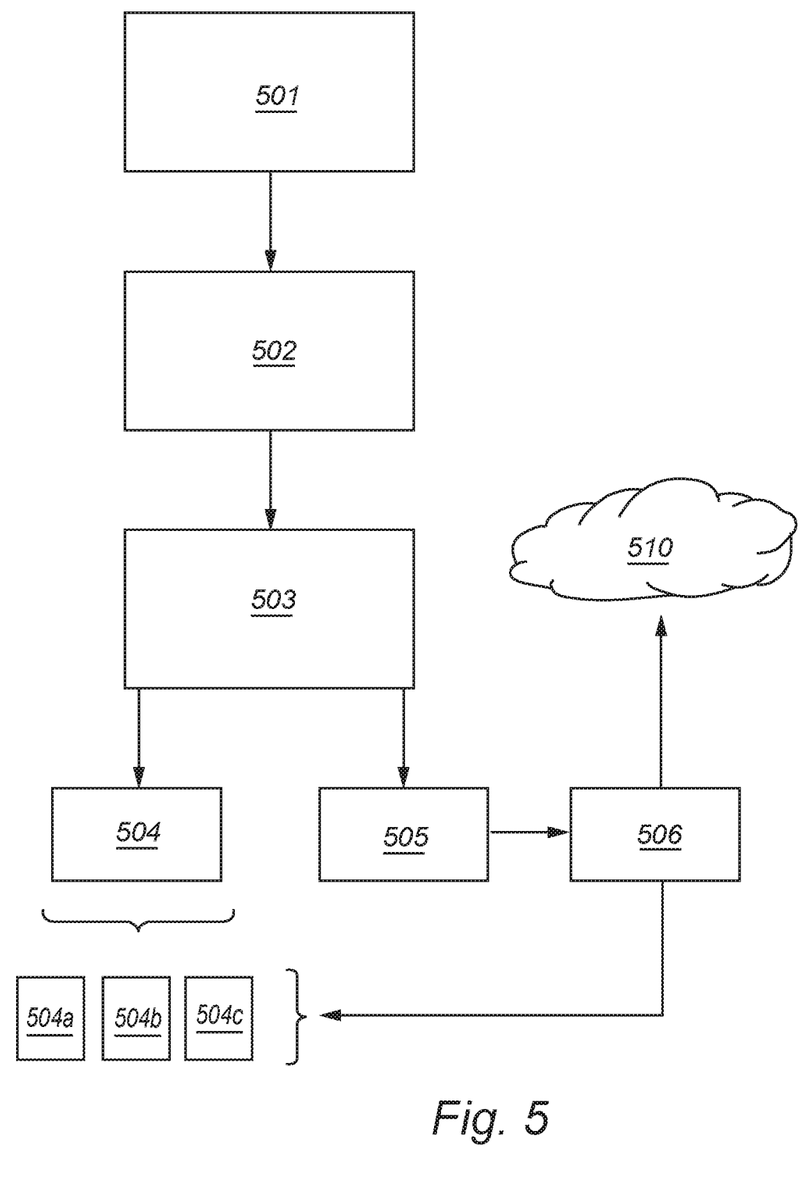
FIG. 5 shows a schematic flow chart of a method for controlling a valve actuator in accordance with yet another embodiment of the present invention.

FIG. 5 illustrates a flow chart representing a method for controlling a valve actuator when it is disconnected from a grid. Initially a valve actuator control device is provided 501, which is connected 502 to a valve actuator with a signal transmitting wire. Operating power is then supplied 503 from an energy storage unit of the control device to the valve actuator, this is in order to enable operation of the valve actuator and consequently of the associated control valve since the actuator is disconnected from the grid. This feature is useful in situations where a new valve actuator is to be installed at larger sites and needs to be tested before it is connected to the general grid of valve actuators. Next, the control device may be used to transmit 504 control signals to the valve actuator, where the control signals may either be intended for configuration 504a, direct control 504b, automation 504c or any of the previously mentioned functions. Direct control can e.g. be to adjust the variable opening of the control valve based on direct input (e.g. push of a button) on the control device, while automation may be to set the valve actuator to run in an automatic mode according to a set of internal operating parameters of the valve actuator. The control device may also be used to receive 505 data or information about the internal parameters of the control device or to extract operating data logs/error logs. The received 505 data may in turn be forwarded 506 to a handheld device (e.g. smart phone or tablet) which is wirelessly connected to the control device. The handheld device may then process the received data in order to perform diagnostics or upload it to a remote server 510 for e.g. statistical purposes. The handheld device can also be used to control the valve actuator via control signals 504a-c forwarded by the control device.

The invention has now been described with reference to specific embodiments. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. A method for controlling a valve actuator when it is disconnected from a grid, said method comprising the steps of:
   providing a valve actuator control device being portable and connectable with a signal transmitting wire to the valve actuator;
   connecting the valve actuator control device to the valve actuator with the signal transmitting wire;
   supplying operating power to the valve actuator from an energy storage unit connected to the valve actuator control device, the energy storage unit providing power to the valve actuator control device and the valve actuator;
   transmitting control signals from the valve actuator control device to the valve actuator via said signal transmitting wire in order to control the valve actuator;
   receiving information signals from the valve actuator to the valve actuator control device via said signal transmitting wire in order to retrieve a set of internal parameters of the valve actuator; and
   detecting a model type of said valve actuator from the received information signals from the valve actuator.

2. The method according to claim 1, wherein said signal transmitting wire is a USB (Universal Serial Bus) cable.

3. The method according to claim 1, further comprising the step of:
   establishing a connection between a portable handheld device and the valve actuator control device.

4. The method according to claim 1, further comprising the step of:
   configuring the valve actuator according to a set of predefined parameters stored in a memory storage unit within the valve actuator control device by:
      uploading said set of predefined parameters from said valve actuator control device to a control unit within the valve actuator.

* * * * *